US009981328B2

(12) United States Patent
Hung et al.

(10) Patent No.: US 9,981,328 B2
(45) Date of Patent: May 29, 2018

(54) BLADE HOLDING DEVICE

(71) Applicant: Basso Industry Corp., Taichung (TW)

(72) Inventors: Liang-Chi Hung, Taichung (TW); Li-Hsin Chang, Taichung (TW)

(73) Assignee: Basso Industry Corp., Taichung (TW)

( * ) Notice: Subject to any disclaimer, the term of this patent is extended or adjusted under 35 U.S.C. 154(b) by 43 days.

(21) Appl. No.: 15/202,827

(22) Filed: Jul. 6, 2016

(65) Prior Publication Data

US 2017/0008101 A1 Jan. 12, 2017

(30) Foreign Application Priority Data

Jul. 9, 2015 (TW) .............................. 104211118 U

(51) Int. Cl.
*B23D 51/14* (2006.01)
*B23D 51/08* (2006.01)
*B23D 51/18* (2006.01)

(52) U.S. Cl.
CPC ............. *B23D 51/08* (2013.01); *B23D 51/18* (2013.01); *B23D 51/14* (2013.01)

(58) Field of Classification Search
CPC ......... B23D 51/08; B23D 51/10; B23D 51/14
USPC ................................................... 83/699.21
See application file for complete search history.

(56) References Cited

U.S. PATENT DOCUMENTS

| 2,394,034 | A | * | 2/1946 | Blum | ..................... | B23D 51/14 |
| | | | | | | 30/514 |
| 3,927,893 | A | * | 12/1975 | Dillon | ................. | B23B 31/1071 |
| | | | | | | 279/75 |
| 4,083,112 | A | * | 4/1978 | Palm | ..................... | B23D 51/10 |
| | | | | | | 279/67 |
| 6,796,161 | B2 | * | 9/2004 | Hsieh | ..................... | B21D 28/34 |
| | | | | | | 30/360 |
| 6,851,194 | B1 | * | 2/2005 | Chen | ..................... | B23D 51/10 |
| | | | | | | 279/71 |
| 7,441,338 | B2 | * | 10/2008 | Delfini | ................. | B23D 49/162 |
| | | | | | | 279/81 |
| 9,744,605 | B2 | * | 8/2017 | Wang | ..................... | B23D 51/10 |
| 2007/0283579 | A1 | * | 12/2007 | Hsieh | ..................... | B23D 51/10 |
| | | | | | | 30/392 |
| 2011/0260415 | A1 | * | 10/2011 | Lin | ..................... | B23B 31/1071 |
| | | | | | | 279/43 |
| 2014/0197609 | A1 | * | 7/2014 | Chen | ................... | B23B 31/1074 |
| | | | | | | 279/97 |

\* cited by examiner

*Primary Examiner* — Kenneth E Peterson
(74) *Attorney, Agent, or Firm* — Trop Pruner & Hu, P.C.

(57) ABSTRACT

A blade holding device for securely holding a saw blade includes a holding unit, a sleeve member, a retaining unit, and a shell. The holding unit includes a clamp member and an insert. The clamp member has two half portions defining a gap for receiving the saw blade, a slot extending through one of the half portions, and an abutment surface. The insert is inserted into the slot, abuts against the abutment surface, and has a threaded hole. The sleeve member surrounds the half portions of the clamp member without blocking the threaded hole. The retaining unit includes a fastening member extending threadedly through the threaded hole for pressing against the saw blade. The shell surrounds the sleeve member and the clamp member.

9 Claims, 6 Drawing Sheets

BLADE HOLDING DEVICE

CROSS-REFERENCE TO RELATED APPLICATION

This application claims priority of Taiwanese Patent Application No. 104211118, filed on Jul. 9, 2015.

FIELD

The disclosure relates to a holing device, and more particularly to a blade holding device that is capable of securely holding a saw blade of a pneumatic saw.

BACKGROUND

Referring to FIGS. 1 and 2, a conventional blade holding device 1 for holding a saw blade 2 includes a clamp member 11, a sleeve ring 12, a shell 13, two fixing members 14, and two fastening members 15. The clamp member 11 has two spaced-apart half portions 111 defining a gap 110 therebetween, and two spaced-apart threaded holes 112 extending through one of the half portions 111 and communicating spatially with the gap 110. The gap 110 is for receiving the saw blade 2. The sleeve ring 12 is sleeved on an end part of the half portions 111 of the clamp member 11 (see FIG. 2). The shell 13 has a shell body 131 surrounding the sleeve ring 12 and the clamp member 11, and being formed with an opening 132 to expose the threaded holes 112. The fixing members 14 extend through the shell 13 and threadedly engage the clamp member 11 so that the shell 13 is secured to the clamp member 11. The fastening members 15 extend through the opening 132, and respectively and threadedly extend through the threaded holes 112 to press against the saw blade 2 for securing the saw blade 2.

The conventional blade holding device 1 has the following drawbacks:

1. Since the sleeve ring 12 is sleeved on only the end part of the half portions 111 of the clamp member 11, when a user uses the back of the saw blade 2 to hit a hard object (not shown), the sleeve ring 12 may not be able to provide sufficient coupling strength, and the sleeve ring 12 and the shell 13 may be easily damaged.

2. The saw blade 2 may need to be replaced frequently. Threads of the threaded holes 112 of the clamp member 11 may be worn due to repeated screwing and unscrewing of the fastening members 15 for replacing the saw blade 2. As such, the fastening members 15 and the clamp member 11 may fail to hold the saw blade 2 securely.

3. The shell 13 and the clamp member 11 are secured to each other only by the fixing members 14, when the saw blade 2 reciprocates at a relatively high speed during operation, the shell 13 may slide out from the clamp member 11 when the restriction imposed by the fixing members 14 is overcome or when the fixing members 14 is broken.

SUMMARY

Therefore, an object of the disclosure is to provide a blade holding device that can alleviate at least one of the drawbacks of the prior art.

According to one aspect of the disclosure, the blade holding device is for securely holding a saw blade. The blade holding device includes a holding unit, a sleeve member, a retaining unit, and a shell. The holding unit includes a clamp member and an insert. The clamp member has two spaced-apart half portions defining a gap therebetween, a slot extending through one of the half portions and communicating spatially with the gap, and an abutment surface being adjacent to the slot. The gap is adapted for receiving the saw blade. The insert is inserted into the slot, abuts against the abutment surface, and is formed with a threaded hole. The sleeve member surrounds the half portions of the clamp member without blocking the threaded hole. The retaining unit includes a fastening member that extends threadedly through the threaded hole and that is adapted to press against the saw blade for securing the saw blade. The shell has a shell body that surrounds the sleeve member and the clamp member, and that is formed with a window to expose the threaded hole.

According to another aspect of the disclosure, the blade holding device includes a holding unit, a sleeve member, a retaining unit, and a shell. The holding unit has two half portions and a threaded hole. The half portions extend in a longitudinal direction, are spaced apart from each other in a transverse direction transverse to the longitudinal direction, and define a gap therebetween. The gap extends in the longitudinal direction and is adapted for receiving the saw blade. The threaded hole is formed in one of the half portions, and communicates spatially with the gap. The sleeve member includes a surrounding wall that surrounds the half portions of the clamp member, that extends in the longitudinal direction across the threaded hole, and that is formed with an opening to expose the threaded hole. The retaining unit includes a fastening member that extends threadedly through the threaded hole and that is adapted to press against the saw blade for securing the saw blade. The shell has a shell body that surrounds the sleeve member and the holding unit, and that is formed with a window to expose the threaded hole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
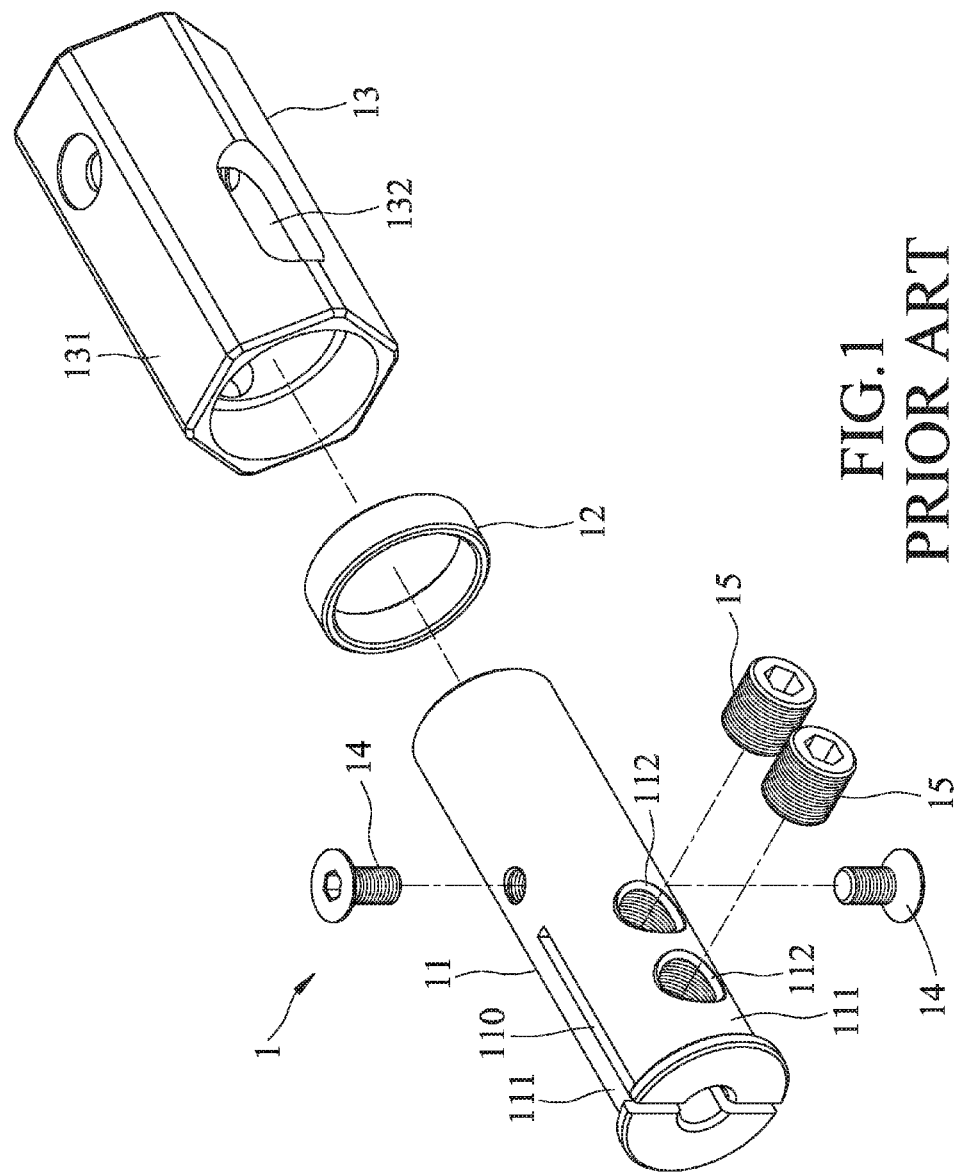
FIG. 1 is an exploded perspective view of a conventional blade holding device.
Figure 2:
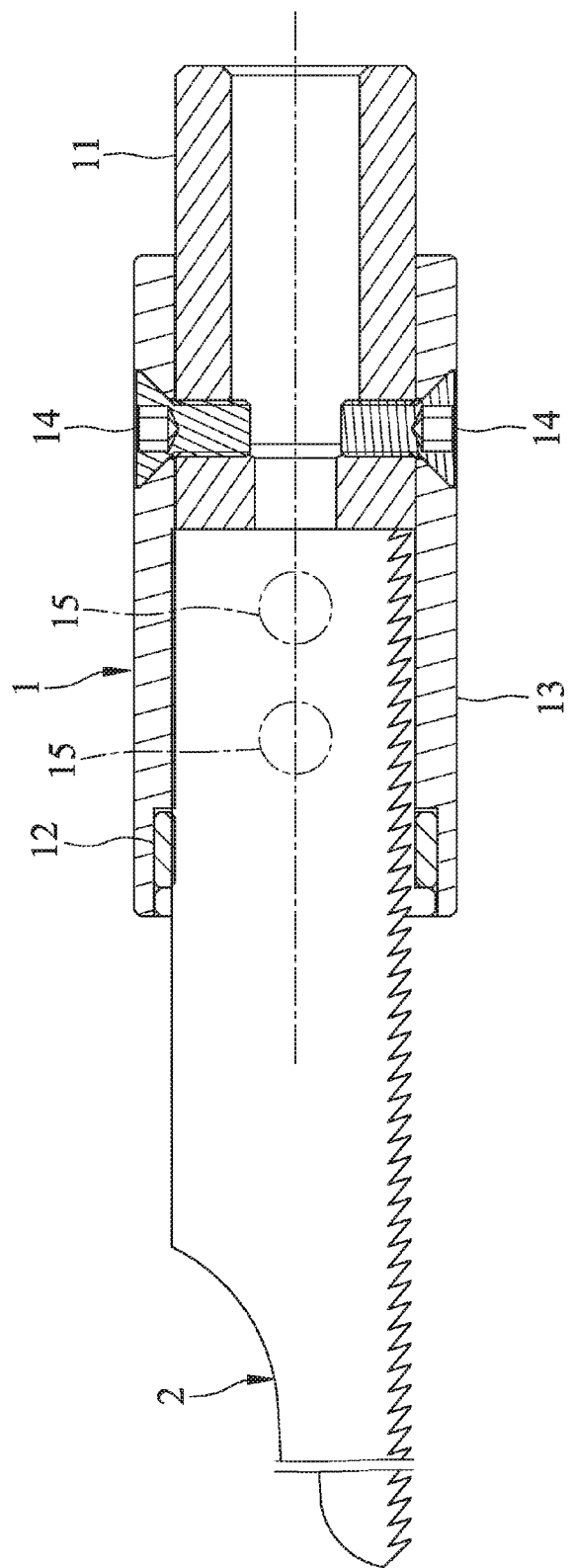
FIG. 2 is a sectional view illustrating the conventional blade holding device holding a saw blade.
Figure 3:
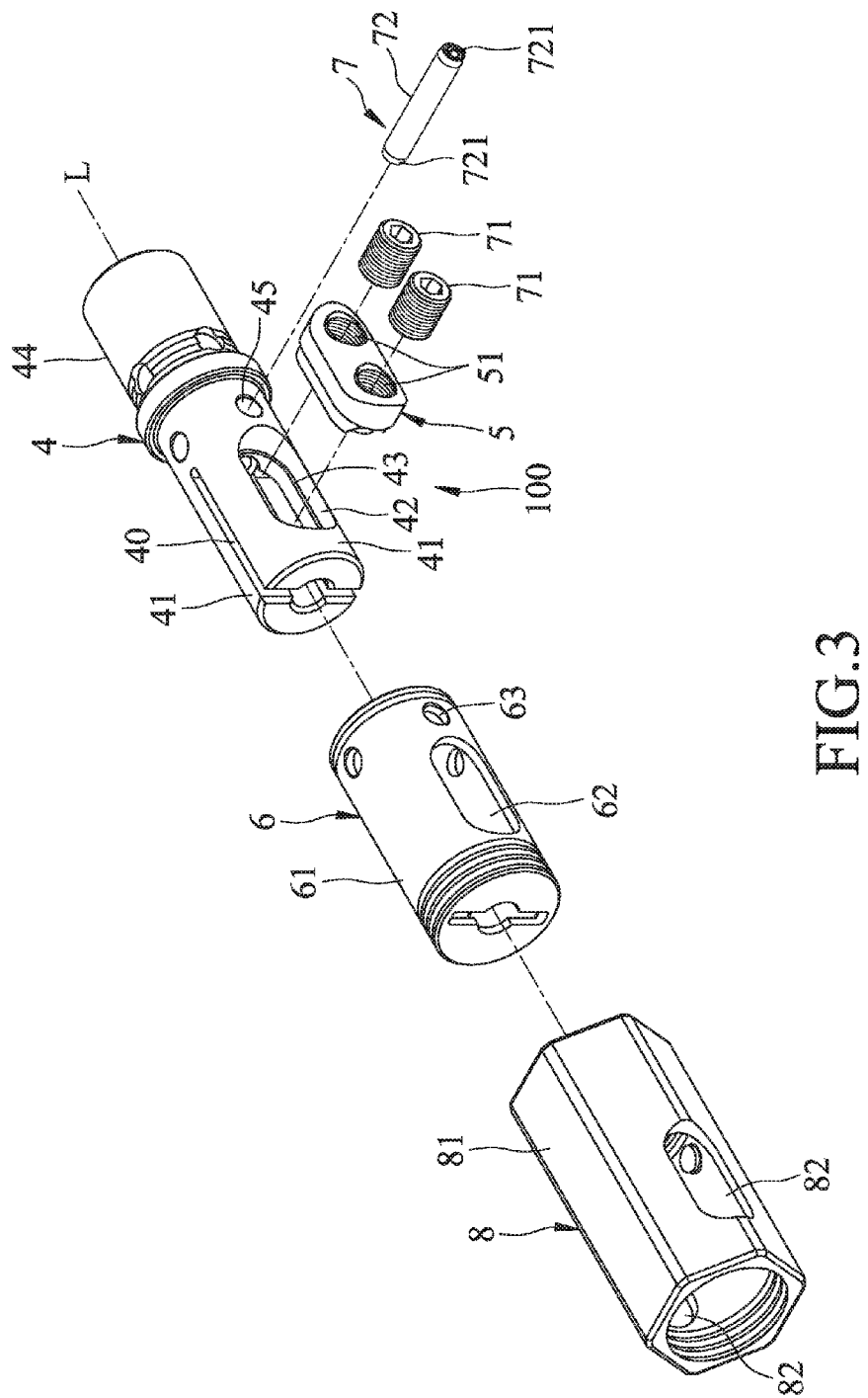
FIG. 3 is an exploded perspective view of an embodiment of a blade holding device according to the disclosure.
Figure 4:
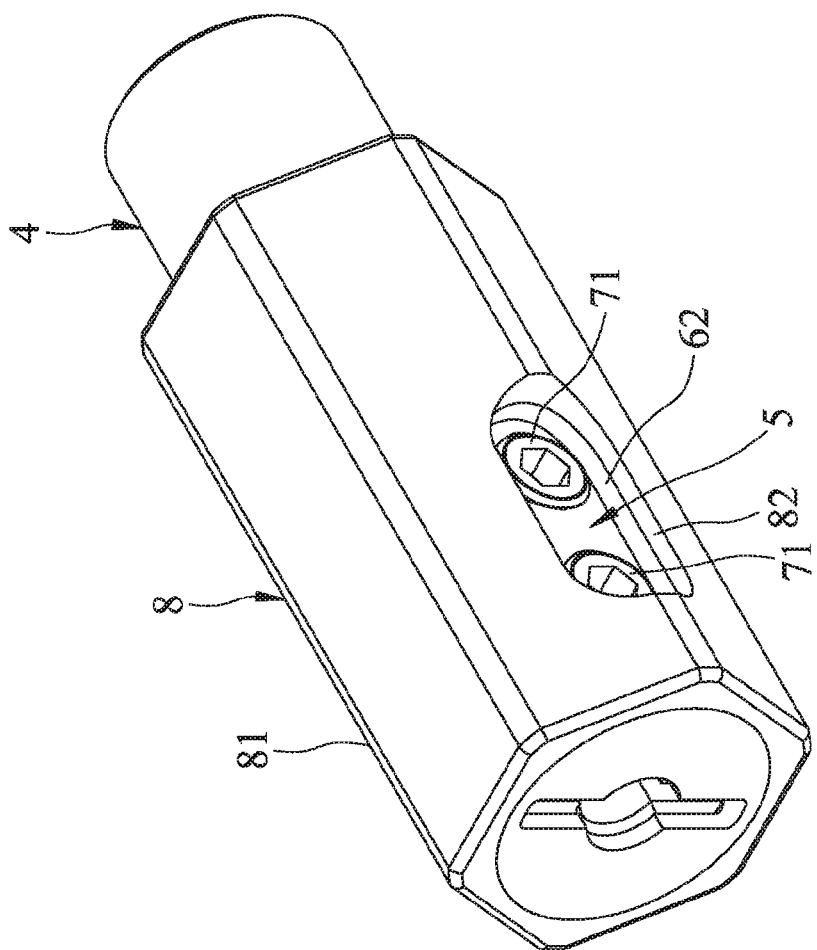
FIG. 4 is an assembled perspective view of the embodiment.
Figure 5:
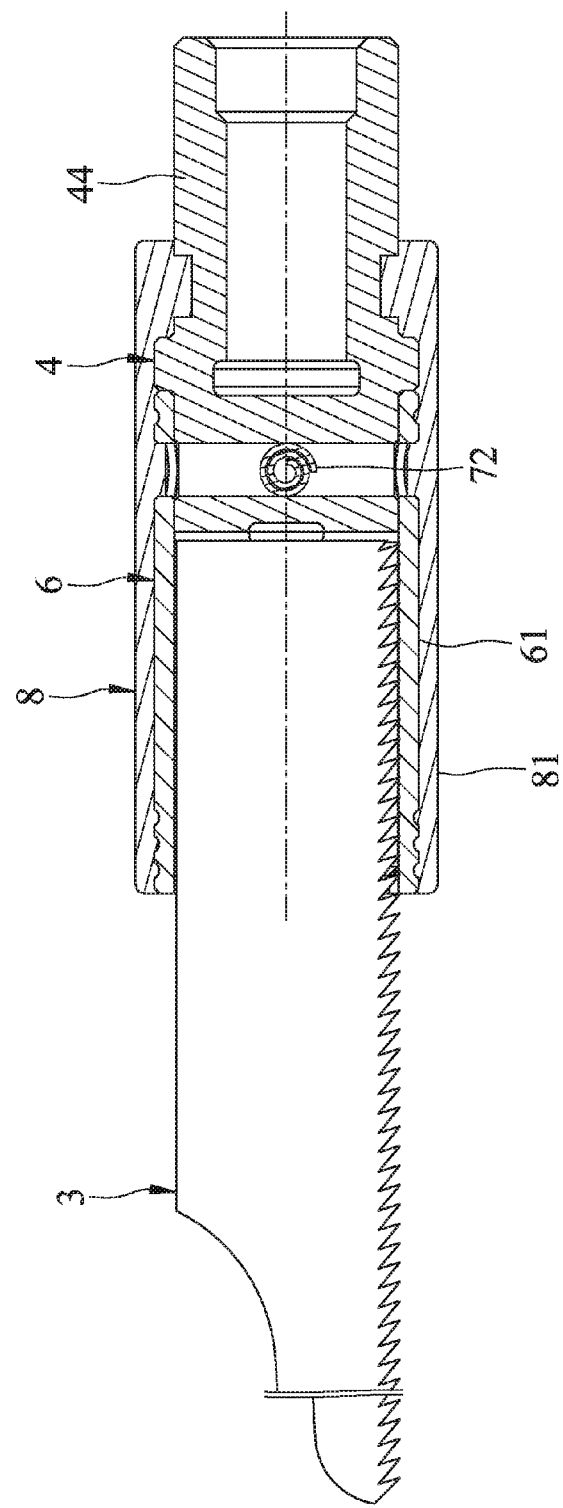
FIG. 5 is a sectional view illustrating the embodiment holding a saw blade.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 3 to 6, an embodiment of a blade holding device according to the disclosure is for securely holding a saw blade 3 (see FIG. 5) of a pneumatic saw (not shown). The blade holding device includes holding unit 100, a sleeve member 6, a retaining unit 7, and a shell 8.

The holding unit 100 includes a clamp member 4 and an insert 5. The clamp member 4 has two spaced-apart half portions 41, a slot 42, an abutment surface 43, a body portion 44, and an aperture 45. The half portions 41 of the clamp member 4 extend in a longitudinal direction (L), are spaced apart from each other in a transverse direction transverse to the longitudinal direction (L), and define a gap 40 therebetween. The gap 40 extends in the longitudinal direction (L), and is for receiving the sawblade 3. The slot 42 is elliptical, extends through one of the half portions 41 and communicates spatially with the gap 40. The abutment surface 43 is adjacent to the slot 42, and faces away from the gap 40. The body portion 44 of the clamp member 4 is connected to rear ends of the half portions 41. The aperture 45 extends through the body portion 44.

The insert 5 is made of metal, is elliptical and is inserted fittingly into the slot 42. In this embodiment, the insert 5 abuts against the abutment surface 43, is formed with two threaded holes 51, and is made of iron.

The sleeve member 6 surrounds the half portions 41 of the clamp member 4 without blocking the threaded holes 51. The sleeve member 6 has a surrounding wall 61 that extends in the longitudinal direction (L) across the threaded holes 51, that surrounds the half portions 41 of the clamp member 4, and that is formed with an opening 62 to expose the threaded holes 51. The opening 62 is smaller than the insert 5 so that the sleeve member 6 and the clamp member 4 cooperatively confine the insert 5 therebetween. In this embodiment, the sleeve member 6 further has two through holes 63 that extend through the surrounding wall 61, and that are registered with the aperture 45 of the clamp member 4.

In this embodiment, the retaining unit 7 includes two fastening members 71 and a lock pin 72. The fastening members 71 extend threadedly and respectively through the threaded holes 51, and are adapted to press against the saw blade 3 for securing the saw blade 3. The lock pin 72 secures the sleeve member 6 to the clamp member 4. Specifically, the lock pin 72 extends through one of the through holes 63, the aperture 45, and the other one of the through holes 63. The lock pin 72 has opposite end portions 721 corresponding in position to and extending out of the through holes 63, respectively.

Figure 6:
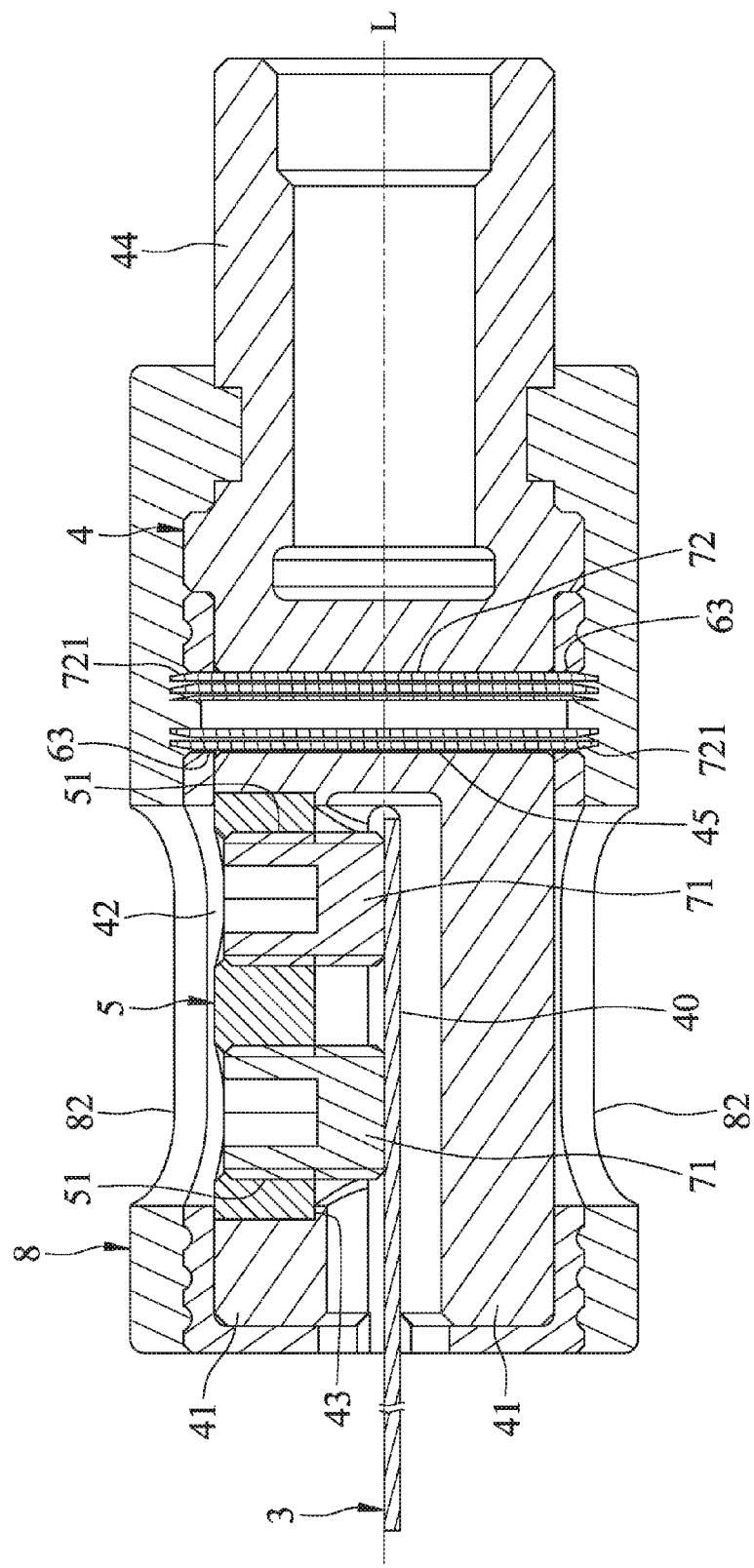
FIG. 6 is another sectional view illustrating two fastening members of the embodiment pressing against the saw blade for securing the saw blade.

As shown in FIG. 6, the shell 8 surrounds the sleeve member 6 and the holding unit 100, and has a shell body 81. The shell body 81 is formed by injection molding, surrounds the sleeve member 6 and a part of the body portion 44 of the clamp member 4, and is connected to the end portions 721 of the lock pin 72. In this embodiment, the shell body 81 is formed with two windows 82 (see FIG. 3) opposite to each other. One of the windows 82 is registered with the opening 62 of the sleeve member 6 to expose the threaded holes 51 of the insert 5.

During manufacture, first the insert 5 is inserted into the slot 42 of the clamp member 4, and then the sleeve member 6 is sleeved on the half portions 41 of the clamp member 4 so as to confine the insert 5 between the sleeve member 6 and the clamp member 4. Next, the lock pin 72 is inserted through one of the through holes 63, the aperture 45, and the other one of the through holes 63 so as to couple the sleeve member 6 to the clamp member 4. Then the shell 8 is formed on the sleeve member 6 and the clamp member 4 by injection molding.

To install the saw blade 3 on the blade holding device, the saw blade 3 is inserted into the gap 40 of the clamp member 4. Afterwards, the fastening members 71 are permitted to extend through said one of the windows 82 and the opening 62, and then extend threadedly and respectively through the threaded holes 51 of the insert 5 until the fastening members 71 press securely against the saw blade 3.

In summary, the blade holding device of the disclosure has the following advantages:

1. The sleeve member 6 extends in the longitudinal direction (L) across the threaded holes 51 of the insert 5 so that the entire half portions 41 are surrounded by the sleeve member 6. Such configuration enhances the structural strength of the blade holding device, and reduces the possibility of damage to the sleeve member 6 and the shell 8 when the back of the saw blade 3 is used to hit a hard object (not shown).

2. Since the insert 5 is made of metal, the insert 5 has a relatively strong structural strength, and threads of the threaded holes 51 are not easily damaged by repeated screwing and unscrewing of the fastening members 71 for replacing the saw blade 3. Thus, the service life of the holding unit 100 is increased.

3. The shell 8 is formed by injection molding with the shell body 81 surrounding the sleeve member 6 and the clamp member 4, and being connected to the end portions 721 of the lock pin 72. In this way, the structural integrity of the blade holding device is enhanced, thereby increasing the service life of the blade holding device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A blade holding device for securely holding a saw blade, said blade holding device comprising:
    a holding unit including
        a clamp member that has two spaced-apart half portions defining a gap therebetween, a slot extending through one of said half portions and communicating spatially with said gap, and an abutment surface being adjacent to said slot, said gap being adapted for receiving the saw blade, and
        an insert that is inserted into said slot, that abuts against said abutment surface, and that is formed with a threaded hole;
    a sleeve member surrounding said half portions of said clamp member without blocking said threaded hole;
    a retaining unit including a fastening member that extends threadedly through said threaded hole and that is adapted to press against the saw blade for securing the saw blade; and a shell having a shell body that surrounds said sleeve member and said clamp member, and that is formed with a window to expose said threaded hole.

2. The blade holding device as claimed in claim 1, wherein said retaining unit further includes a lock pin that secures said sleeve member to said clamp member.

3. The blade holding device as claimed in claim 2, wherein:
   said half portions of said clamp member extend in a longitudinal direction, and are spaced apart from each other in a transverse direction transverse to the longitudinal direction;
   said gap extends in the longitudinal direction; and
   said sleeve member has a surrounding wall that extends in the longitudinal direction, that surrounds said half portions of said clamp member, and that is formed with an opening registered with said window of said shell, said fastening member extending through said window and said opening, and extending threadedly through said threaded hole of said insert.

4. The blade holding device as claimed in claim 3, wherein:
   said clamp member further has a body portion connected to said half portions, and an aperture extending through said body portion;
   said sleeve member further has a through hole that extends through said surrounding wall; and
   said lock pin extends through said through hole and said aperture.

5. The blade holding device as claimed in claim 4, wherein:
   said sleeve member has two of said through holes that are registered with said aperture;
   said lock pin extends through one of said through holes, said aperture, and the other one of said through holes, and has opposite end portions corresponding respectively in position to said through holes; and
   said shell body is formed by injection molding, surrounds said sleeve member and said body portion of said clamp member, and is connected to said end portions of said lock pin.

6. The blade holding device as claimed in claim 3, wherein said opening of said sleeve member is smaller than said insert so that said sleeve member and said clamp member cooperatively confine said insert therebetween.

7. The blade holding device as claimed in claim 1, wherein said insert is formed with two of said threaded holes, and said retaining unit includes two of said fastening members extending threadedly and respectively through said threaded holes.

8. The blade holding device as claimed in claim 1, wherein:
   said slot of said clamp member is elliptical; and
   said insert is elliptical.

9. The blade holding device as claimed in claim 1, wherein said insert is made of metal.

* * * * *